United States Patent [19]
Barrus et al.

[11] Patent Number: 5,366,303
[45] Date of Patent: Nov. 22, 1994

[54] PRINTER RIBBON MOTOR CONTROLLER

[75] Inventors: Gordon B. Barrus, San Juan Capistrano; Ricky T. K. Choy, Santa Ana; Ryan Takakawa, Fullerton, all of Calif.

[73] Assignee: Printronix, Inc., Irvine, Calif.

[21] Appl. No.: 59,535

[22] Filed: May 11, 1993

Related U.S. Application Data

[63] Continuation of Ser. No. 807,114, Dec. 13, 1991, abandoned.

[51] Int. Cl.$^5$ .............................................. B41J 33/14
[52] U.S. Cl. .................................. 400/234; 400/225; 400/239; 318/89; 318/696
[58] Field of Search ............... 400/239, 234, 249, 225; 242/75, 75.4, 75.42, 75.43, 75.44; 318/138, 254, 59, 60, 86, 89, 696, 685

[56] References Cited

U.S. PATENT DOCUMENTS

| | | | |
|---|---|---|---|
| 4,103,216 | 7/1978 | Hayes | 318/685 |
| 4,177,731 | 12/1979 | Kliest et al. | 400/225 |
| 4,224,628 | 9/1980 | Murray | 400/120 |
| 4,349,771 | 9/1982 | Buxton | 318/685 |
| 5,187,419 | 2/1993 | DeLange | 318/805 |

*Primary Examiner*—Edgar S. Burr
*Assistant Examiner*—John S. Hilten
*Attorney, Agent, or Firm*—George F. Bethel; Patience K. Bethel

[57] ABSTRACT

This disclosure sets forth a dot matrix printer having an improved ribbon drive. The ribbon drive is provided by two respective stepper motors. When one stepper motor is in a take-up mode, the second is in a feed mode. The process is reversed proximate the end of the tape as it is unwound. A re-generative mode for the feed motor is provided and a resistance bank varies amounts of drag on the ribbon as it is fed from the feed motor spool. Both motors when in the take-up mode are driven by full H bridge drivers and amplifiers controlled by a micro controller through an address and decode input and output latch. In order to provide for a uniform velocity of the print ribbon the angular velocity of the take up motor is controlled by counting the zero crossings of the feed motor, and then loading it into the micro controller to compare it with a look-up table for purposes of providing a proper speed to the take-up motor and the proper peak drag through the resistance bank to the feed motor. All functions are controlled by the micro controller and firmware logic provided thereto.

15 Claims, 3 Drawing Sheets

PRINTER RIBBON MOTOR CONTROLLER

This application is a continuation of application Ser. No. 07/807,114, filed Dec. 13, 1991, now abandoned.

FIELD OF THE INVENTION

The field of this invention pertains to printers and particularly those printers that have ribbons that are impacted for printing on a piece of paper. In such printers, it is known to drive a ribbon between two spools. Generally, one end of the ribbon is connected to a spool driven by a motor in a winding or take-up mode. The other portion of the ribbon is connected to a spool that had previously been wound onto and is in a feed mode.

BACKGROUND OF THE INVENTION

This invention is particularly adapted to ribbon drives for impact printers. Such impact printers can be dot matrix printers and more specifically line type printers. Such line printers are known in the art and have been developed extensively by the assignee of this invention.

The ink ribbons of such various printers are repeatedly impacted against a length of print paper or other printable medium by certain impact elements. The impact elements may each define a shape or a character in the case of a full character printer. Alternatively, the impact elements can simply print dots, with characters or other indicia to be printed being formed in a dot matrix fashion.

Such dot matrix printers can be of the serial type in which a print head containing a number of print wires, needles, or other dot forming elements is reciprocated across a width of printer paper. The print wires are selectively actuated to impact the print paper through a length of ribbon to print dots on the paper.

Dot matrix printers can also be of the line printer type in which a plurality of hammers or other impact printing mechanisms are mounted along the length of a hammerbank. They are driven by a shuttle assembly and are selectively actuated to impact the print paper. The impact is through a length of ink ribbon. This prints dots on the paper as the shuttle assembly is caused to undergo reciprocating motion relative to the paper. These printers can be exemplified by way of example of a dot matrix line printer in U.S. Pat. No. 3,941,051, entitled Printer System, by Barrus, et al. It is commonly assigned with the present application.

The printers of the type described in U.S. Pat. No. 3,941,051 to Barrus et al utilizes a ribbon drive. The ribbon drive has an opposite pair of spools disposed adjacent opposite ends of a print station. This is defined by the interface between a platen supported length of print paper and a reciprocating hammer bank.

The ink ribbon extends through the print station and has the opposite ends thereof wound upon an opposite pair of spools. During printing, the opposite spools of the ribbon drive are rotatably driven to provide continuous motion of the length of ribbon through the print station. When the end of the ribbon is reached the direction of drive of the spools is reversed. This causes the ribbon to move through the print station in the opposite direction.

A major problem for all printers is the drive of the spools. An example of this problem is exemplified in U.S. Pat. No. 4,177,731 commonly assigned to the assignee of this application. In the prior art, the drive of the spools was often by means of a D.C. or other continuous motor. The motors turned in a manner and were driven so as to not accurately account often times for the change of radius of the unwinding or winding of the ribbon on the spools. This adversely affected the velocity of the printer ribbon across the print station.

The foregoing action created problems associated with ribbon usage, as well as the quality of print.

This invention overcomes many deficiencies of prior art ribbon drives by using a pair of two phase stepper motors. The stepper motors control the tension and the velocity of the print ribbon between the two spools. At any given time during printing, one motor pulls ribbon through the print station at a constant velocity while the second motor is run in a regenerative mode to provide tension within the system's operational requirements. When the ribbon reaches the end of it's travel in any given direction, it's direction is reversed so that the function of the two respective motors and spools are then reversed.

The angular velocity of the feed motor or motor attached to the spool from which the ribbon is unwinding, is calculated by counting the number of zero crossings on the back EMF waveform. In any given period of time the angular velocity of the take-up motor is set by the system micro controller. The ratio of the angular velocities of the feed take-up spool or reel is a unique number over the range of ribbon radii in the system.

The ribbon stretch is insignificant over the normal life of the ribbon as well as the packing factor on the take-up reel or spool upon which the ribbon is wound or pulled. Thus, the radius of the ribbon material on each reel can be determined at set intervals based upon the ratio of the angular velocities. This ratio information used to determine the angular velocity and tension is updated at any given time.

The above method allows a set of micro-step interval timer tables to relate the ratio of the angular velocities from the last sample interval to the next required angular velocity on the take-up spool or reel to maintain a constant linear velocity. The invention provides the ability to control tension as well as velocity which are independently controllable variables. It should be kept in mind that substantially constant linear velocity is one of the key results of this invention. With this ability, the finite characteristics of the ribbon velocity thereby become a more readily ascertainable factor as to the characteristics of ribbon wear, print, dot ratios, spacing, and general overall print quality.

The invention also accounts for jams and tearing of the ribbon. This helps to avoid a catastrophic failure out of the normal sequence of the printer's operation.

To effectuate the invention, a take-up two phase stepper motor or winding motor drive with a take-up spool or reel is driven by a pair of voltage mode pulse width modulation (pwm) amplifiers. One is for each phase of the respective two phase stepper motor. The average voltage across the motor terminals is proportional to the duty cycle at a given supply voltage. The micro controller determines the value of the duty cycle at a given angular velocity for each micro-step from a set of look up tables. Instead of a look up table the value can also be calculated by an on going real time calculation.

An object of this invention is to maintain a constant linear ribbon velocity across the print station.

Another object is to provide the ability to change ribbon velocity on "the fly" to accommodate different print modes.

A further object is to create a system with the ability to accommodate different standard lengths of ribbon materials.

Another object of the invention maintains a constant ribbon tension tracked independently of the ribbon velocity.

Finally a substantially important object of the invention is the ability to detect all fault modes and report it to the main system controller.

From the foregoing, it can be seen that the inherent improved characteristics of the ribbon drive with the attendant superior ribbon performance established by the stepper motor drive of this system is a significant step over the art which shall be expanded upon hereinafter.

SUMMARY OF THE INVENTION

In summation, this invention is a controlled stepper motor drive system for a dot matrix printer ribbon wherein the crossings of the feed motor control the speed of the drive motor. The ribbon is controlled in a manner to provide for substantially constant velocity and improved ribbon movement characteristics with sufficient operational tension.

More specifically, the invention comprises a pair of identical two phase stepper motors. The motors are driven by pulse width modulated (pwm) sine waves generated by a micro controller and custom driver integrated circuit. Each stepper motor drives a ribbon spool or reel to move the ribbon across the print station at a substantially constant rate.

During normal running, one of the stepper motors is driven as a drive motor or drive for the take-up reel or spool while the other is de-energized. The de-energized motor provides drag to the reel or spool which is feeding the tape or printer ribbon to the drive spool connected to the drive motor.

One or more resistors can be switched across the coils or winding of the de-energized motor. Alternatively a variable impedance load can be connected across the coils to perform the drag function. This serves to regulate the drag on the ribbon and thus regulate ribbon tension.

The stepper motors are generally micro-stepped. However, this is not specifically an absolute requisite. Each of the respective motor's electrical cycle is broken up into multiple divisions such as 32 in this embodiment. The divisions describe a pseudo-sinusoidal waveform. The complementary co-sine wave driving the other motor winding commutates that motor. The frequency of the sine and co-sine wave establishes the angular velocity of the motor. At each stepped division, the micro controller uses a look up table or a real time calculation can be performed of duty cycle values which it loads into registers in the custom integrated circuit. The integrated circuit uses these values to produce a voltage square wave of fixed frequency within a specified duty cycle. This duty cycle determines the average voltage of the drive motor, connected to the take-up spool, and thus the current level for that step.

A comparison is made between the number of de-energized motor electrical zero crossings so that the firmware is able to determine the relative angular speeds and thus the relative radii of the ribbon on the spools. After calculating a new drive ribbon radius, the firmware then decides on a new angular speed to maintain a given linear speed of the ribbon across the print station. This therefore creates the constant linear velocity of the ribbon across the print station for improved printing on a consistent basis. The ribbon speed across the print station is varied for optimum performance for each print mode.

In order to maintain constant ribbon tension, a variable drag torque is provided. The resultant current through the windings generated through the back EMF on the de-energized drag motor provides the drag torque. In order to increase or decrease the current (i.e. drag torque) resistor combinations are switched across the windings of the motor serving as the drag motor. This change of drag torque by switching the resistors or as an alternative a variable impedance amplifier provides for multiple drag forces through the stepper motor serving as the drag motor.

The respective mode of each motor from drag motor to take-up motor is provided by the firmware after a turn around sequence has been detected at the respective ends of the tape.

Other improvements are provided herein that allow for a parking of the tape to maintain ribbon tension. Further advantages are the versatility afforded by the direct software control. This allows for various ribbon speeds, drag tension, stall detection, parking and turn around algorithms, or driving waveform shapes capable of being changed with little or no trouble to accommodate changes in product specifications or hardware.

DESCRIPTION OF THE PREFERRED EMBODIMENTS

Figure 1:
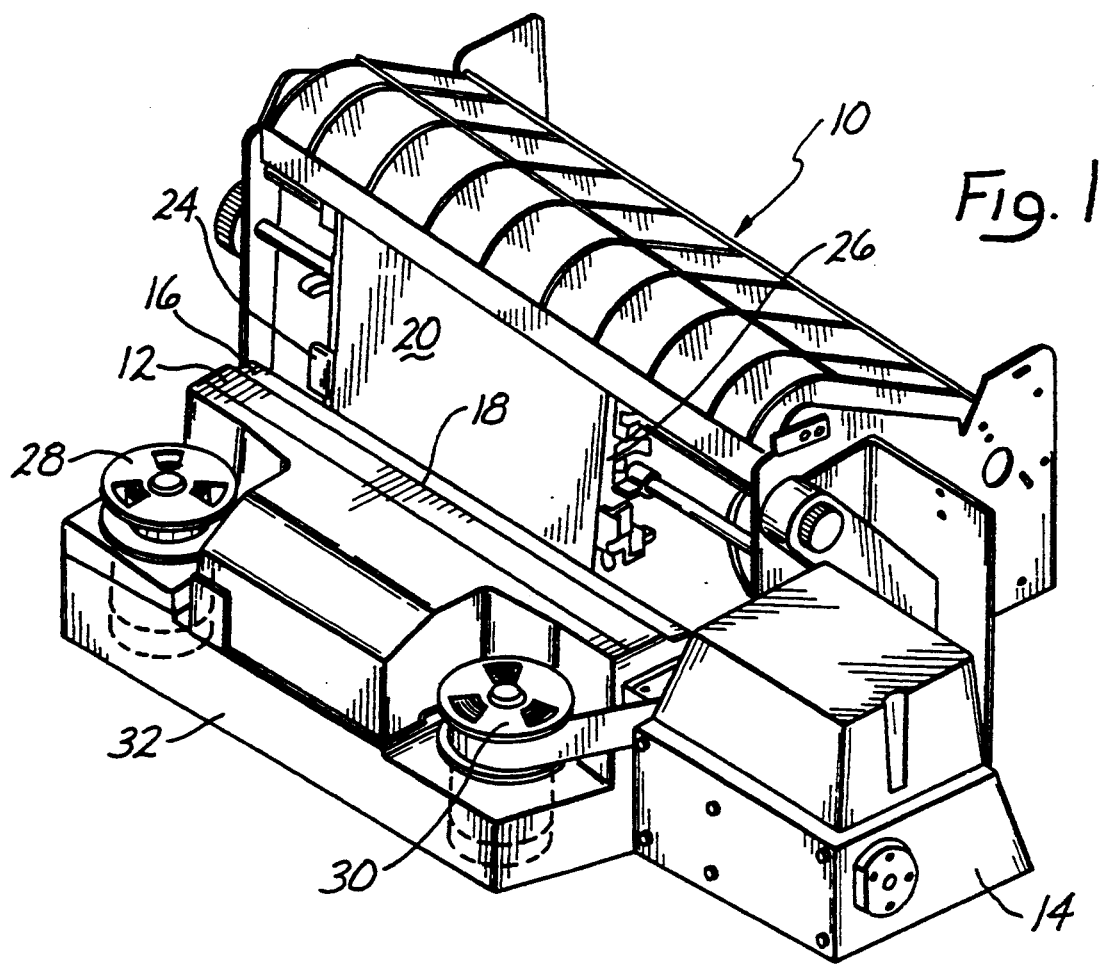
FIG. 1 shows a perspective view of the printer of this invention.

FIG. 1 shows a printer 10 of the type known as a dot matrix line printer. Such a printer type is shown and described in the previously referenced U.S. Pat. No. 3,941,051 of Barrus, et al.

The printer includes an elongated hammerbank 12. The hammerbank 12 is mounted and driven in a reciprocating manner by a cam driven shuttle drive 14. The hammerbank reciprocates with respect to a stationary platen 16. The space between the hammerbank 12 and the stationary platen 16 defines a print station 18. This is more easily seen in FIG. 2.

Figure 2:
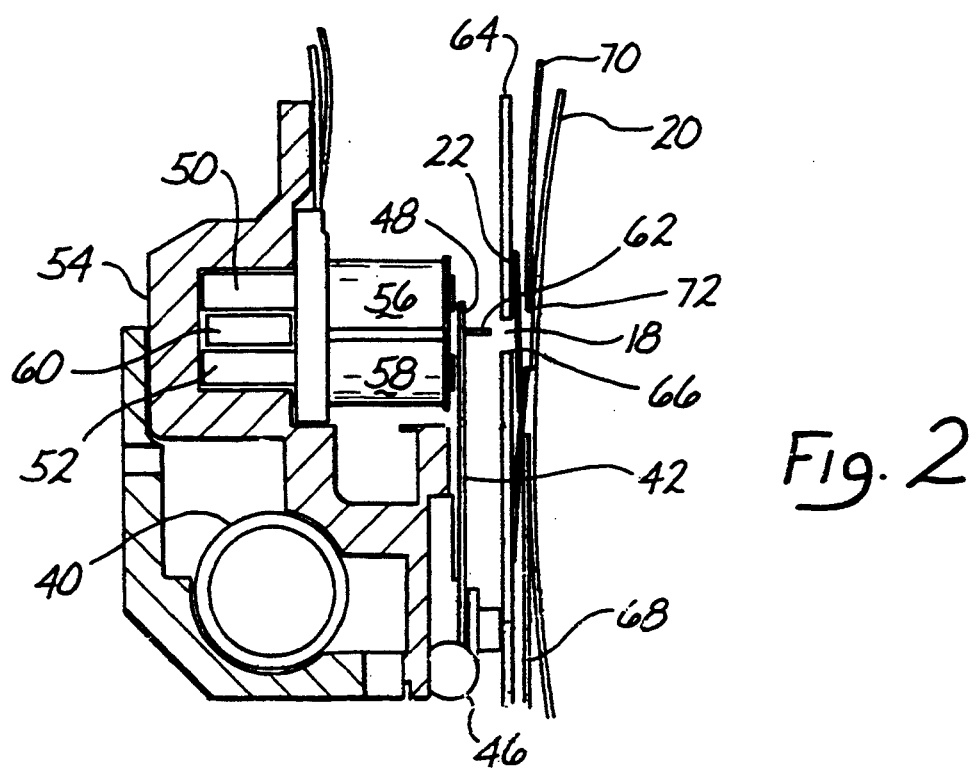
FIG. 2 shows a partially sectioned view through a midline area of the printer print station.

Looking more particularly at FIGS. 1 and 2, it can be seen that within the print station 18 is a length of print paper 20 and an ink or print ribbon 22.

The print paper 20 is advanced upwardly through the print station 18 by two opposite tractor drives 24 and 26. The tractor drives 24 and 26 move the paper 20 upwardly as each row of dots is printed thereacross.

The ink ribbon 22 extends along the length of the print station 18 and has the opposite ends thereof wound on two opposite pairs of reels or spools 28 and 30.

Spools 28 and 30 are connected to the ribbon drive 32 at the lower end of the printer 10.

Figure 3:
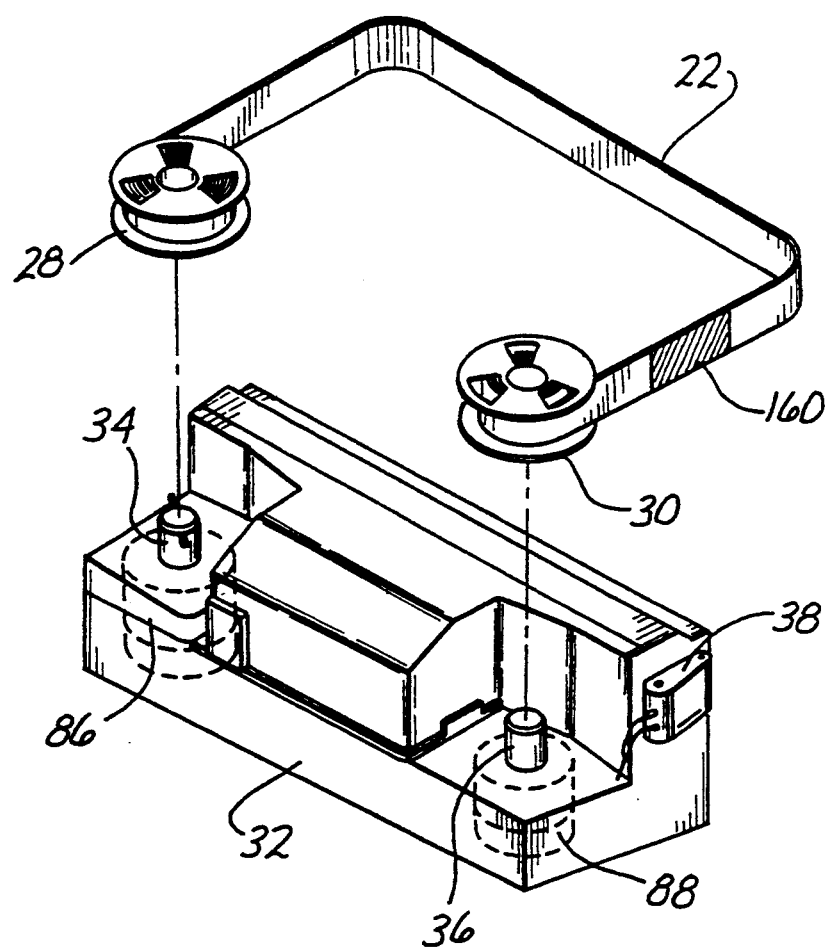
FIG. 3 shows a perspective view of the drive and ribbon portions of this invention shown in FIG. 1.
Figure 4:
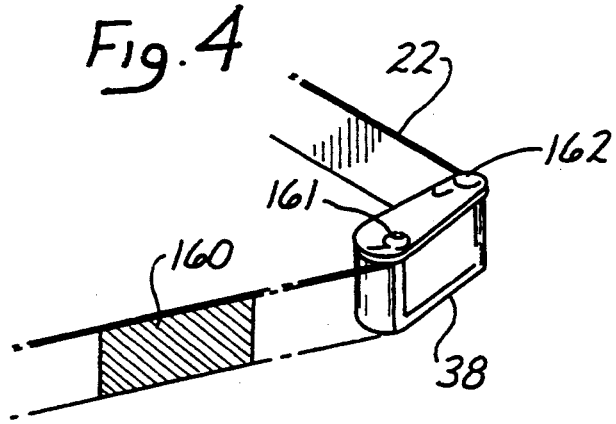
FIG. 4 shows a perspective view of the electrically conductive tape of the ribbon crossing over two detection bars.

The ribbon drive 32 is shown in an exploded form in FIG. 3. The opposite spools 28 and 30 are removably mounted on spindles 34 and 36. Spindles 34 and 36 are connected to stepper motors which shall be detailed hereinafter as to the motors and their control system. In order to dispose the ribbon 22 within the print station 18 it is facilitated by a pair of guides mounted on opposite ends, one of which is shown as guide 38 in FIGS. 3 and 4. The other guide which is a mirror image of guide 38 is hidden from view.

When the printer 10 is printing, it is driven by the stepper motors turning the spindles 34 and 36. The speed of the ribbon 22 can vary depending upon the type of printing conditions required and the speed which can range in the realm of 2 to 9 inches per second (ips). Generally, the ribbon 22 is advanced in one direction such as from the spool 30 to the spool 28 and then reversed thereafter in the manner that will be enhanced by this invention.

Looking at the sectional view of FIG. 3 it can be seen that the hammerbank 12 includes a shuttle shaft 40 which extends from the opposite ends to a mount in the hammerbank 12 for reciprocating motion. A plurality of resiliently flexible hammer springs 42 are shown.

The hammer springs 42 are mounted along a length of the hammerbank 12 such that a lower end 44 of each spring 42 is secured to a base 46. An opposite upper end 48 of each hammer spring 42 is free to move with the flexure of the spring 42.

Normally, the springs 42 are magnetically held in a retracted position against a pair of pole pieces 50 and 52 mounted within a frame 54 of the hammer bank 12. A pair of coils 56 and 58 are mounted on the pole pieces. Between the pole pieces 50 and 52, a permanent magnet 60 is disposed between them and within the frame 54.

The upper end 48 of the hammer spring 42 is normally held in a retracted position against the pole pieces 50 and 52 by a permanent magnet forming a magnetic circuit therewith. When the coils 56 and 58 are momentarily energized, it overcomes the magnetic force and releases the hammer spring 42 from its retracted position. This causes dots to be printed on the paper by a dot printing impact tip 62. Afterwards, the spring 42 rebounds into the retracted position against the pole pieces 50 and 52. It remains in this position until the next firing sequence.

A thin planar hammerbank cover 64 is mounted on the base 46 of the hammerbank. The cover 64 has a plurality of apertures 66 spaced along the length thereof. The apertures 66 are disposed adjacent to the impact tips 62 allowing them to extend therethrough for impacting the ink ribbon 22.

A thin planar paper ironer 68 of resilient material is disposed between the paper 20 and the hammerbank cover 64. This resiliently bears against the paper 20 to create a drag and hold the paper under tension as it is advanced upwardly by the opposing tractor drives 24 and 26. A ribbon mask 70 serves as a guide for the ink ribbon 22 and prevents direct contact between the ribbon and the paper except that area through which the dot printer impact tips 62 pass.

In order to drive the spools 28 and 30, two stepper motors 86 and 88 are shown connected to the spindles 34 and 36. The stepper motors 86 and 88 are connected to the controller circuitry of the invention as shown generally by the lead lines 90 and 92. Lines 90 and 92 are deemed to be for descriptive purposes only inasmuch as the respective stepper motors comprise a first and second series of poles for two phase operation. The first and second series of poles can be in any multiple even series such as 8 or 16. They are connected to the respective lines shown hereinafter with respect to their connection to full H bridge drivers. In this case, lines 77 and 79 connect a first phase for motor 86, while lines 81 and 83 connect a second phase. Lines 85 and 87 connect a first phase for motor 88, while lines 89 and 91 connect a second phase.

The two phase stepper motors are in this case 1.8 degree stepper motors shown as motors 86 and 88. They are connected to the two ribbon spools 28 and 30 by spindles 34 and 36.

At any given time during normal printing one of the two motors 86 or 88 provides the drive torque to pull the ribbon 22 through the print station 18.

While this is happening the other motor provides the required tension to maintain proper ribbon tracking through its drag action. When the end of the ribbon 22 is reached the functions of the two respective motors 86 and 88 are reversed.

Figure 5:
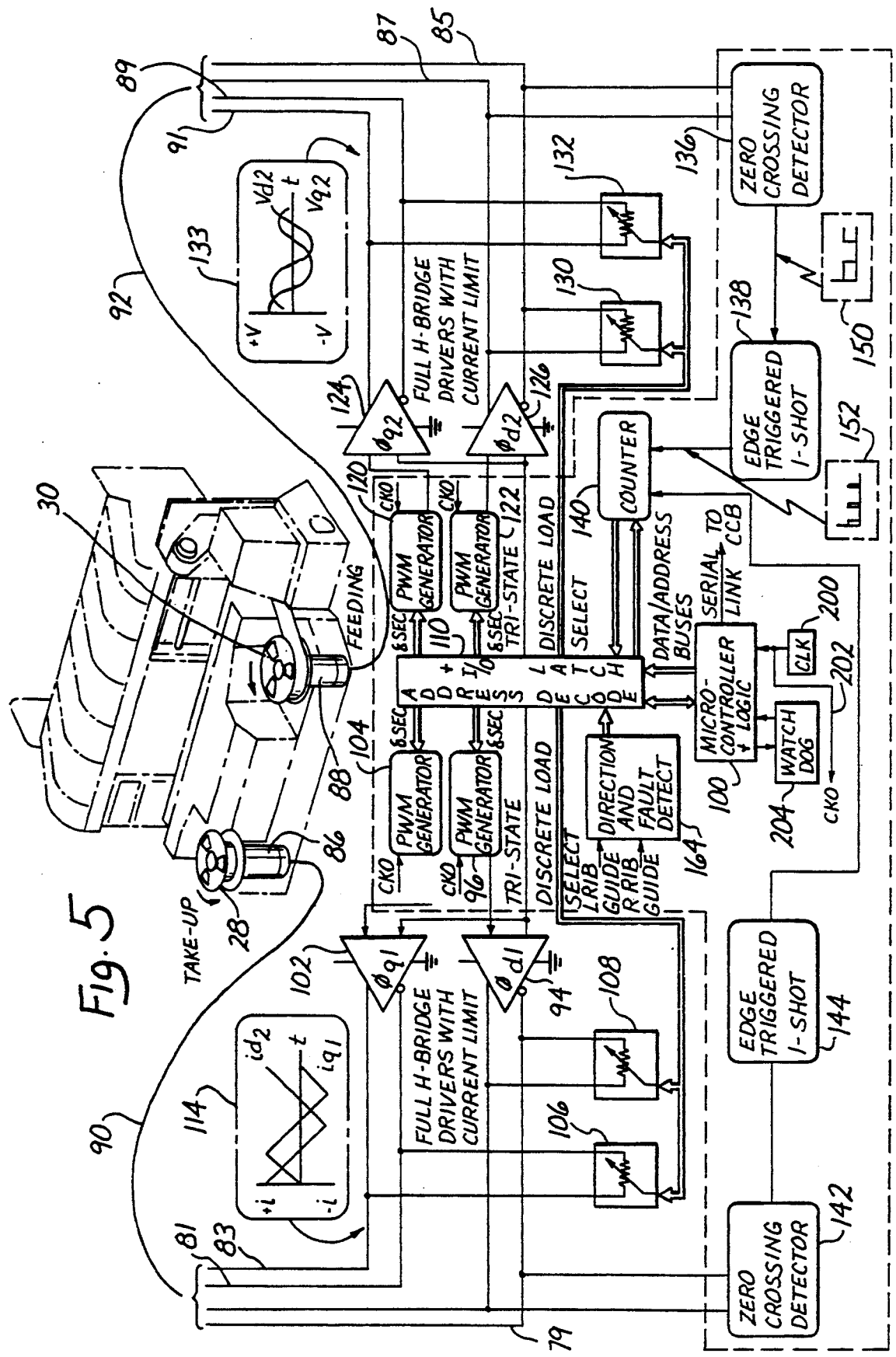
FIG. 5 shows the printer of FIG. 1 connected to the schematic elements of the electronic drive system of this invention.

In the schematic description shown in FIG. 5, motor 86 is providing the drive torque to take up and pull the ribbon 22 across the print station 18. One phase of the motor 86 is driven through lines 77 and 79 by a full H bridge 94 connected to a pulse width modulator (pwm) generator 96. The duty cycle of the pulse width modulator generator 96 is determined by a digital number loaded into the latch 98 by the system micro controller 100. The pwm generator 96 can be substituted with any type of linear amplifier.

In like manner, the other phase referred to as a quadrature phase is driven through lines 81 and 83 by another full H bridge 102 connected to another pwm generator 104 or in the alternative, a linear amplifier. The duty cycle thereof is also determined by the system micro controller 100.

The foregoing provides for a voltage mode pwm drive. During this driving mode, load resistor banks 106 and 108 are held in a tri-state mode by the system micro controller 100 via the address decode input output latch 110. This effectively disconnects the resistor banks 106 and 108 from the output circuit of the full H bridges 102 and 94, or in the alternative variable resistance amplifiers substituted for the resistor banks.

The reason why the resistors 106 and 108 are disconnected is to prevent any load being applied to the drive motor amplifier. The load when applied is for creating a drag as will be seen in the drag relationship of the motor 88 in its regenerative mode. The other resistor bank is symmetrical in function to the resistors 106 and 108.

The micro controller 100 logic determines the duty cycle of the pwm generators 96 and 104 in a manner that provides a 90 degree phase shift of the current waveform between the two phases of motor 86. This waveform relationship can be seen as to the phase shift of the current shown in the cut out of the current waveform illustrated in the block and graph 114. In effect, current is being provided in the 90 degree phase shift mode to motor 86 through the two respective full H bridge drivers 102 and 94.

As an aside, H bridges are fundamentally known in the art as devices providing a switch function or switch means at each of the four terminal points at the ends of the H, with a load or resistance across the transverse portion of the H. Accordingly, current can go from one side of the H bridge to the other through the load, looped backwardly through the H bridge or provided in any other manner where the four switches can function in cooperation with each other in their open or closed phase.

The micro controller 100 updates the duty cycle of the pwm generators 96 and 104 in a manner that the vector sum of the torques of the two phases created by the resultant current profiles is a constant. This provides a constant torque drive. As the ribbon 22 on the take-up spool 28 accumulates, the micro controller 100 logic reduces the angular velocity of the motor 86 to maintain a constant linear velocity of the ribbon 22. This is through the update provided by pulse width modulation generators 120 and 122 or linear amplifiers at the appropriate times in a manner to be described hereinafter through the zero crossing and edge triggered circuitry connected to the motor 88 in the regenerative mode serving as a drag motor. Here again the pulse width modulator generators 120 and 122 can be substituted by any suitable type of linear amplifier.

As the angular velocity of the take-up or winding motor 86 is reduced, the micro controller 100 logic updates the pwm generators 96 and 104 in a manner that maintains a constant peak current which is established through the H bridges 94 and 102 in the 90 degree phased manner shown in block 114.

As mentioned in the preamble of the description, with regard to the drag functions, a retarding torque is provided in the given mode shown by motor 88 when the ribbon 22 is unwinding. When motor 86 is providing take-up or winding torque, thereby pulling the ribbon 22, motor 88 provides a retarding torque or drag. This maintains tension on the ribbon 22 between the feed reel or spool 30 and the ribbon guide 38. The tension is established within an acceptable range for proper tracking by the motor 88 being operated in a regenerative mode.

In the regenerative mode of operation, the full H bridges 124 and 126 connected to the windings of the motor 88 are held in a tri-state mode by the micro controller 100 logic. This is through the address decode of input output latch 110. The result is to effectively disconnect bridges 124 and 126 from the motor 88. During this mode of operation the load banks or resistors 130 and 132 are connected to the windings of motor 88.

The back emf voltage across the two phases of motor 88 can be seen in the lag of the voltages in a 90 degree manner shown in block 133. These back emf voltages are applied to the respective load banks provided by resistors 130 and 132.

As an alternative to the variable resistor banks 130 and 132, a variable impedance amplifier can be substituted for each variable resistor, or load bank as the case may be.

As the feed reel or spool 30 empties, its angular velocity increases. The effective lever arm for the distance from the center of the shaft of the motor 88 to the edge of the ribbon material 22 on the spool 30 decreases. Based thereon the controller 100 reduces the load on the resistance bank which is comprised of resistors 130 and 132 connected to the two phases of motor 88. This maintains the tension of the print ribbon 22 to pre-established operational limits.

The foregoing mode establishes the motor 88 as a generator providing the retarding torque by converting the mechanical energy that is generated by the unwinding of the spool 30 into electrical energy. This electrical energy is dissipated through the load bank of resistors 130 and 132.

A zero detection circuit 136 is connected across one winding of the motor 88. This creates a pulse width duration corresponding to the positive half cycle of the back electromotive force (BEMF) of the motor 88 while operating in the regenerative mode. This signal is fed into the edge triggered one-shot 138 which creates a pulse for each edge of the half cycle pulse. The signal can be seen in the box 150 provided by the zero crossing detector as it feeds into the edge triggered one-shot 138 providing a one-shot output shown in box 152. The output of the edge triggered one-shot 138 as shown by the waveform in box 152 is then counted by a counter 140.

Since the motor 86 is providing a drive or take-up torque, the signals from its corresponding zero crossing detector 142 and a one-shot 144 are ignored by the counter 140. The zero crossing detector 142 and one shot 144 are analogous to zero crossing detector 136 and one shot 138 respectively. However, they are ignored during the operation of the motor 86 in the take-up function or ribbon 22 winding function.

The angular velocity of the drive motor 86 is determined by the controller 100 which is provided with the equivalent electrical zero crossing counts of the motor 88.

When given the range of the ribbon 22 radii on the respective reels 28 and 30, the ratio of the counts of the zero crossings is a unique number from which the radii of the ribbon 22 material on each reel can be calculated. The controller 100 periodically checks and resets the counter 140. The resulting ratio information is used to alter the drive frequency of the motor 86 to maintain constant linear print ribbon velocity across the print station or position 18 as well as to alter the loading on motor 88 to maintain proper ribbon tension. Motor 88 through its drag function provides the tensioning against the torque pulling the ribbon 22 provided by motor 86.

At the end of the travel of the ribbon 22, when the feed reel 30 is nearly empty, a conductive strip 160 attached to the ribbon 22 passes over the ribbon guide 38. This can be exemplified more clearly in FIGS. 3 and 4 wherein the conductive strip 160 is shown with the ribbon guide 38. At this point, a reversal is signaled. This is caused by the conductive strip 160 shorting two bars 161 and 162. The conductive strip extends across the two bars 161 and 162 that are connected to a detection circuit shown as circuit 164.

The signal is directed and latched into the end of travel/direction latch circuit 164. This causes the controller 100 to reverse the function of the motors 86 and 88.

At this point, the full H bridges 102 and 94 as well as the load banks 130 and 132 are inactivated. The signals from the respective edge triggered one-shot and the zero crossing detector are ignored. The signals from the zero crossing detector 142 and the edge triggered one-shot 144 are then processed. The load banks 106 and 108 as well as the full H bridge drivers 124 and 126 in their alternative mode are activated after an appropriate time delay.

The time delay is established within the micro controller 100 logic to allow a ringing out or settling of the electronics. At such time, the respective take-up and feed motors 86 and 88 apply a degree of tension on the print ribbon 22 to tension it sufficiently across the print station 18.

The spool or real 28 then becomes the feed spool with motor 86 operating in the regenerative mode. Spool or reel 30 then becomes the take-up spool or reel with motor 88 operating in the drive or take-up mode until the opposite reversal strip 160 is sensed by the ribbon guide in connection with the left side of the printer. This reversal strip has not been shown but is bilaterally symmetrical to that shown in FIG. 4 on the left side of the fragmented exploded printer view of FIG. 3.

At any particular time, the controller 100 knows the respective range of count values in the counter 140. Therefore, a condition of a low count which would be indicative of a stalled system or a condition of an excessively high count indicative of a mechanical disturbance causing an abnormal unspooling of the feed reel can be detected. The fault can then be reported to the main system processor via a full duplex serial link. This full system serial link is shown as a serial link to the common controller board (ccb).

A fault condition wherein the ribbon folds and is pulled across the print station 18 typically results in a radius of the material on the take-up spool increasing faster than is normally expected. In effect, when the ribbon folds along its longitudinal length, it increases the over all packing on the spool. This thereby creates an acceleration of the ribbon velocity. The result is a larger than normal count from the zero crossing detection circuits 136 or 142 depending on the mode in which the system is operating as it is connected to the motor of a feed reel or spool. This condition is also flagged to the main system processor as a fault condition.

When the system processor commands the ribbon controller 100 to stop via the serial link to the ccb, commutation of the driving motor ceases. The load (i.e. resistor banks) on the dragging motor operating re-generatively is also then disconnected. After an appropriate time delay, both motors 86 and 88 are driven one electrical cycle in their opposite directions. This serves to tension the ribbon 22 passing through the print station 18.

The controller 100 then updates the pwm generators 96, 104, 120, and 122. This serves to force a reduced dc current through both motors 86 and 88 to maintain a constant tension on the ribbon 22 at stand still.

When the system processor commands the ribbon controller 100 to go into a slack condition via the serial link connected to the ccb, commutation of the driving motor whichever is the case, ceases. All load banks or resistor banks 106, 108, 130, and 132 are then disconnected. The tri-state lines to all H bridges 102, 94, 124, and 126 are asserted to disconnect the amplifiers from the motors. In this mode, with both stepper motors 86 and 88 electrically isolated, the minimum residual or detent torque established by the permanent magnetism of the stepper motor prevents the ribbon material on both spools 28 and 30 from unspooling.

For purposes of understanding, it should be understood that a clock 200 is provided to the circuit. The clock 200 goes into a clock output (cko) line 202.

A watch dog circuit 204 is provided which shuts down the entire printer when a failure mode is detected through the micro controller 100 logic. This watch dog circuit 204 is of a significantly interfering nature so as to prevent any harm to the entire system through its shutdown effort.

The foregoing functions as can be seen except for certain features as the full H bridge drivers and the loads connected across the line are performed by a custom specifically dedicated integrated circuit. In this manner, a limited space is provided while at the same time allowing for prom firmware programming.

The other features of the invention with greater detail are such wherein the two phased stepper motors 86 and 88 are driven by the pulse width modulated sine waves generated by a micro controller which is the micro controller 100 in conjunction with the custom mechanical driver or ASIC.

Each motor 86 and 88 has an electrical cycle which is broken into multiple divisions such as 32 in number describing a pseudo sinusoidal current waveform. This waveform in the complementary co-sine wave driving the other motor winding rotates the motor.

As previously set forth, the micro controller 100 uses a look up table of duty cycle values which it loads into the registers.

Figure 6:
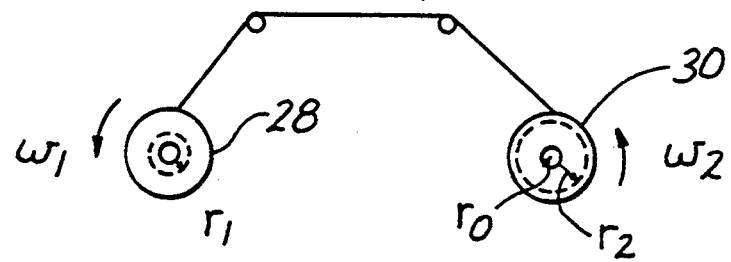
FIG. 6 shows a schematic view of the functions that are utilized to calculate the proper velocity for the ribbon.

As an alternative to the look up table a calculation can be made on "the fly" to determine the angular velocity of the drive motor 86 or take up spool 28 with respect to the feed motor 88 or feed spool 30. The solution for the controller 100 is as follows which is demonstrated by FIG. 6

The optimum velocity v of the ribbon 22 is pre-established with regard to print density and the relationship of the printing function at the print station 18. This optimum print ribbon 22 velocity will vary with respect to types of printing, paper and overall physical parameters of the net result desired. To obtain this the software in the controller can equate print density and the other parameters to the desirable velocity v for which a constant k for that respective print mode is then established. This constant k for a particular optimum print mode is loaded into the controller for each respective print ribbon and type of print job. Thus there are a number of constants or k values that are available in the controller to effectuate optimum printing functions of the printer of this invention.

In order to solve for the angular velocity of the drive spool 28 or motor 86 the following mathematical steps are undertaken as an alternative to the look up table method by the controller 100.

$\omega_1$ = commanded angular velocity of take-up reel 28 or drive motor 86

$\omega_2$ = measured angular velocity of feed reel 30 or drag motor 88 v = linear velocity of ribbon 22 across print station 18

$r_1$ = radius of the ribbon 22 material on the take-up reel 28

$r_2$ = radius of the ribbon 22 material on the feed reel 30

$r_0$ = the inside radius of an empty reel (i.e. 28 or 30)

L = the total length of the ribbon 22 t = the thickness of the ribbon 22

$\pi \approx 3.1416$

If there are no fault disturbances between the respective reels 28 and 30, the velocity v of the ribbon 22 material between the two reels 28 and 30 is the same. In effect:

$$r_1\omega_1 = v = r_2\omega_2 \qquad [1]$$

$$\text{so } r_1 = V/\omega_1 \text{ and } r_2 = V/\omega_2 \qquad [2]$$

The total volume of ribbon 22 material does not change. Thus, the edge area of the ribbon 22 does not change.

This is given by Lt. Therefore, the sum of the ribbon edge areas of the two reels 28 and 30 is a constant described by:

$$Lt = \pi(r_1^2 - r_0^2) + \pi(r_2^2 - r_0^2) \qquad [3]$$

By substituting [1] and [2] into [3] and rearranging:

$$\omega_1 = \frac{\omega_2}{\sqrt{k\omega_2^2 - 1}} \qquad [4]$$

where:

$$k = \frac{\frac{Lt}{\pi} + 2r_0^2}{r^2}$$

The ASIC then uses the solved for angular velocity values of the drive spool 28 or motor 86 to produce voltage square waves of fixed frequency. These values are derived either by solving the foregoing equation or by the look up table method.

The time between duty cycle updates determines the angular speed of the motors 86 and 88. This time interval is constantly updated by the micro controller 100 in order to maintain a constant linear ribbon speed as previously described. This as shown is generated by the back emf of the respective dragging motor.

The time between duty cycle updates determines the angular speed of the motor doing the driving. This time interval is constantly being updated by the controller 100 in order to maintain a constant linear ribbon 22 speed. This is done by monitoring the generated back emf through the re-generatively operated dragging motor. The controller 100 accumulates a count of electrical zero crossings of the generated back emf. Comparing this to the known number of drive motor electric zero crossings, the firmware is able to determine their relative angular speeds and thus relative radii. Having calculated a new drive ribbon radius the firmware can decide on a new angular speed by the foregoing calculated or look up table methods, or similar methods to maintain a given linear ribbon 22 speed across the print station 18.

In order to maintain constant ribbon 22 tension throughout its travel given the fact that a constant driving torque is encountered, the constant dragging torque must be maintained as well. In order to increase or decrease the current drag torque a variety of the resistor combinations as shown in the resistor banks 106, 108, 130 and 132 are provided. Two resistors in this embodiment are available for each winding on the motors 86 and 88. Multiple resistors in any form can be used. The resistors can be switched into single mode or in parallel or not at all resulting in four possible drag load magnitudes. The controller 100 firmware decides on the magnitude of drag load to provide or apply given the drag motor's ribbon speed. In the alternative, a variable impedance amplifier can be applied across the drag motor controlled by the micro controller processor 100.

The firmware in order to reverse the ribbon in the other direction or in order to cause the ribbon to travel in the other direction only reads a flip flop that changes state when the metallic surface 160 contacts the bars 161 and 162. The ratio of 50 electrical cycles per full mechanical cycle insures the flip flop is polled often enough. If the firmware finds that the flip flop has changed state it begins the ribbon reversal or turn around sequence.

The sequence begins with the controller informing a supervisor processor that the ribbon drive direction is about to be reversed. At this point, no printing by the print station is attempted.

The drag load (i.e. resistors 106, 108 and 130 and 132) is open circuited for both motors to insure that the newly energized motor does not have any load switched across its windings. Thereafter the angular ribbon speed is reset to a nominal value or in the alternative determined by its previous value.

The new driving motor now serving the take-up function is energized from its previous de-energized drag motor function. A drag load is then switched across the new drag motor and the current through the driving motor is initialized.

A minor pause such as a 200 ms pause is taken to insure that all ringing or electrical vibration associated with de-energizing the motors has time to settle out. The new drive motor is then allowed to begin rotation and the waveform is begun with a supervisor process.

A substantial advantage of the system of this invention in versatility afforded by the direct software control. Linear ribbon speeds, drag tension values, stall detection limits, parking and turn around algorithms or even driving waveform shapes can all be changed with little or no trouble to accommodate changes in product specifications or hardware. Thus, various widths and lengths of ribbon, print densities, movement characteristics and desired print parameters can all be accommodated by this invention. Therefore, it is a substantial step over the art making it indeed a printer advance that is of significance and should be constrained only by the limits of the following claims.

We claim:
1. A dot matrix printer comprising:
    means to feed a continuous sheet of paper;
    platen means on which said paper can be fed;
    an elongated printer bar having a plurality of striking means for actuation toward said paper;
    a ribbon which can be driven between said striking means and said paper against which said striking means can strike to impress a dot on said paper against said platen;
    a pair of spools around which said ribbon is wound for holding said ribbon to allow it to unwind and be fed from one of said spools and be wound with velocity and tension on the other of said spools wherein one spool can be a winding spool while the other spool has the ribbon unwound from it as a feed spool and in the alternative said spools provide for reverse operational functions;
    a stepper motor connected to each of said spools for rotationally driving said spools;
    a controller having means for driving one of said stepper motors as a take-up motor in connected relationship to one of said spools to provide a rotational torque thereon to wind said ribbon on said spool with an angular velocity;
    said controller further having means for causing the other of said stepper motors to function as a feed motor connected to the other spool;
    variable electrical load means for connection to the coils of said feed motor to provide a drag on the other of said stepper motors by being operated with an electrical waveform having zero crossings in a regenerative mode to provide tension on the ribbon as it is being fed out from the spool to which it is connected;

said controller further having means for counting the number of zero crossings on the back of the waveform of the feed motor in a given period of time; and, said controller further having means for controlling the two respective motors based on said zero crossings.

2. The printer as claimed in claim 1 wherein:

said stepper motors are two phased stepper motors to respectively control said velocity and tension of the print ribbon between the two spools in one mode and wherein each one performs the other function when the print ribbon is reversed.

3. The printer as claimed in claim 1 further comprising:

a micro controller to set the angular velocity of the take-up motor having a controller input based upon the angular velocity of the feed motor.

4. The printer as claimed in claim 1 wherein:

said variable electrical load means is controlled by a micro controller and an interfaced address to provide the drag required to maintain said ribbon in tension.

5. The printer as claimed in claim 4 further comprising:

an amplifier to provide discrete control of current to the take up motor as set by the controller so that appropriate torque can be applied by the take-up motor, 6. An improvement in a printer having a plurality of spring loaded hammers that are held by a magnetic force which is released by at least one coil overcoming the magnetic force to allow the release of the hammer against a print ribbon overlying a sheet of paper on a platen in order to impress a printed mark through the print ribbon and wherein said print ribbon is driven by a take-up spool and unwound from a feed spool such that the respective functions of the take-up spool and feed spool can be reversed to a feed and take-up mode respectively wherein the improvement comprises:

a multi phase stepper motor for driving said spools when in the take-up mode and wherein:

said stepper motor being connected to the spool in a take-up mode, and positively driven, said motor being connected to said spool in the feed mode and operable in a regenerative mode to provide a drag on the print ribbon between said take-up spool and said feed spool;

a zero crossing detector for detecting the zero crossings of the motor operating in a regenerative mode; and, controller having means for counting said zero crossings to provide a respective number of counts to a micro controller for controlling the speed of the print ribbon by the speed of the take up spool.

7. The improvement as claimed in claim 6 further comprising:

a respective driver for each of the phases of said stepper motors that are controlled by a micro controller.

8. The improvement as claimed in claim 7 wherein:

the regenerative mode includes a load in the form of a resistor or variable impedance means across at least one of the phases of the stepper motor that is connected to the feed spool.

9. The improvement as claimed in claim 8 wherein:

said motor connected to the take-up spool is driven by current provided by the drivers as controlled by amplifier connected to each driver.

10. The improvement as claimed in claim 6 further comprising:

a one shot connected between said zero crossing detector and said counter to provide signals from said zero crossing detector to said counter.

11. An improved printer comprising:

a paper drive means for driving a continuous length of paper;

platen means for supporting said paper;

a plurality of striking means;

a print ribbon interposed between said striking means and said paper for imprinting a print impression on said paper by said print ribbon;

a pair of spools around which said print ribbon is wound;

means for guiding said print ribbon from said spools between said striking means and said paper;

a stepper motor connected to each spool for driving one of said spools in a take up mode while the other spool feeds said print ribbon, the spool from which said print ribbon being fed is connected to the other one of said stepper motors and being operable in a regenerative mode and further having means to provide an output related to its angular velocity to control the speed of the print ribbon as one of said motors is connected to said take-up spool is operated in take-up mode;

zero crossing detection means to detect zero crossings of the voltage of said stepper motor connected to said feed spool; and controller means for controlling the two respective motors based upon the zero crossings.

12. The improved printer as claimed in claim 11 wherein:

said motor connected to the tape-up spool is driven by at least one driver connected to an amplifier for each phase of such stepper motor.

13. The improved printer as claimed in claim 12 wherein:

said motor connected to the spool in the feed mode is controlled by a load means as to the drag that it provides said print ribbon.

14. The improved printer as claimed in claim 11 wherein:

said zero crossings from at least one phase of the motor connected to said feed spool are counted by a counter interfaced with a one shot between said zero crossing detector and said counter to determine the rotational movement of said feed spool motor for control of said take up motor.

15. The improved printer as claimed in claim 14 further comprising:

means for reversing said take-up motor and said feed motor to respectively be the feed and take-up motor for drive torque and regenerative drag.

* * * * *